No. 647,939. Patented Apr. 24, 1900.
L. BRONSON.
COMBINED HARVESTER, THRESHER, AND SEPARATOR.
(Application filed Aug. 17, 1898.)
(No Model.) 12 Sheets—Sheet 1.

Witnesses:
Thos Raley.
M. Protzkosky.

Levi Bronson
Inventor
by A. B. Harvey
his Attorneys

No. 647,939. Patented Apr. 24, 1900.
L. BRONSON.
COMBINED HARVESTER, THRESHER, AND SEPARATOR.
(Application filed Aug. 17, 1898.)
(No Model.) 12 Sheets—Sheet 3.

No. 647,939. Patented Apr. 24, 1900.
L. BRONSON.
COMBINED HARVESTER, THRESHER, AND SEPARATOR.
(Application filed Aug. 17, 1898.)

(No Model.) 12 Sheets—Sheet 4.

Fig. 4.

Witnesses:
Chas. Raley.
M. Piotrzkowsky

Levi Bronson
Inventor
by A.B. Harvey
his Attorneys

No. 647,939. Patented Apr. 24, 1900.
L. BRONSON.
COMBINED HARVESTER, THRESHER, AND SEPARATOR.
(Application filed Aug. 17, 1898.)
(No Model.) 12 Sheets—Sheet 5.
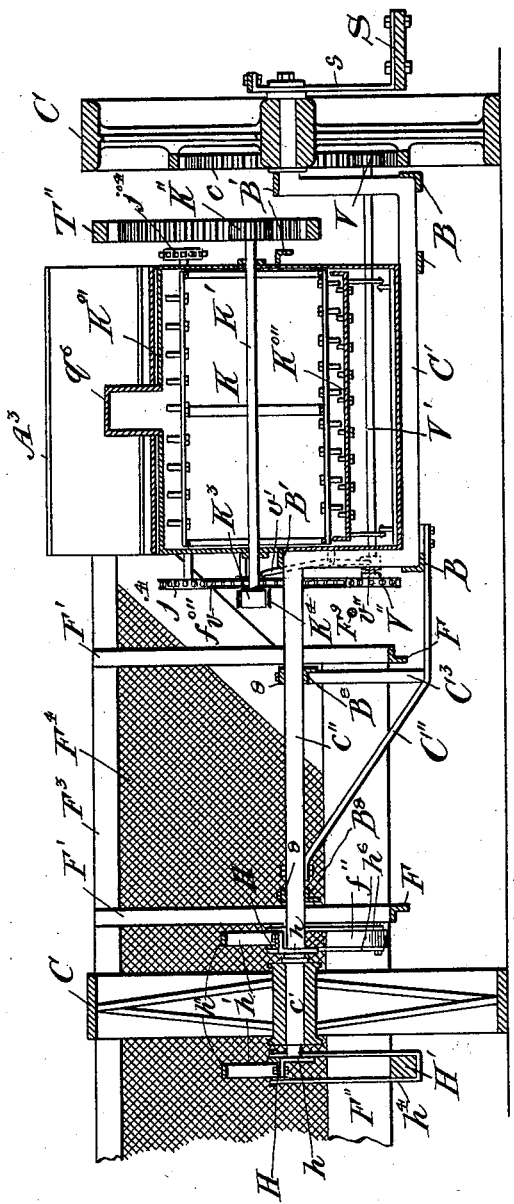

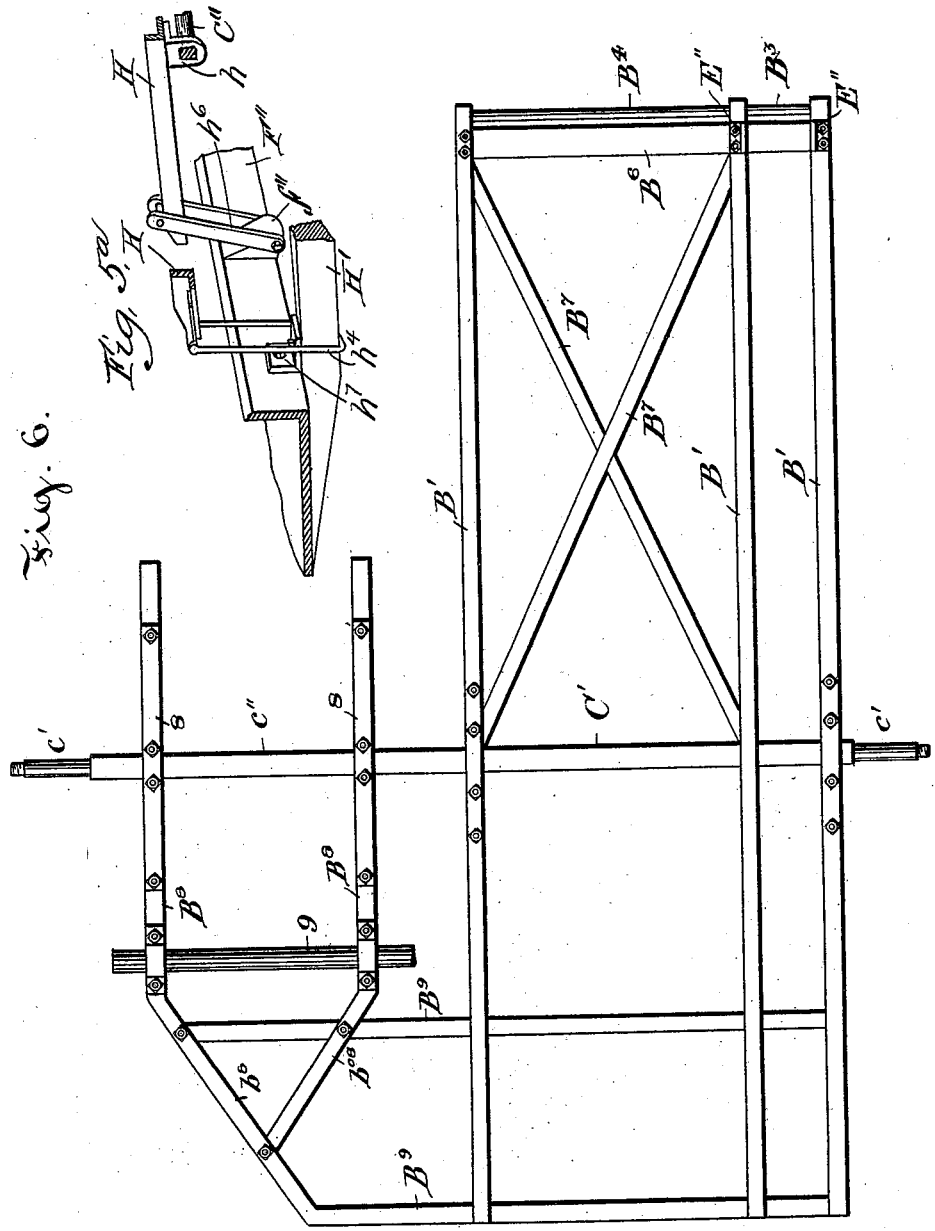

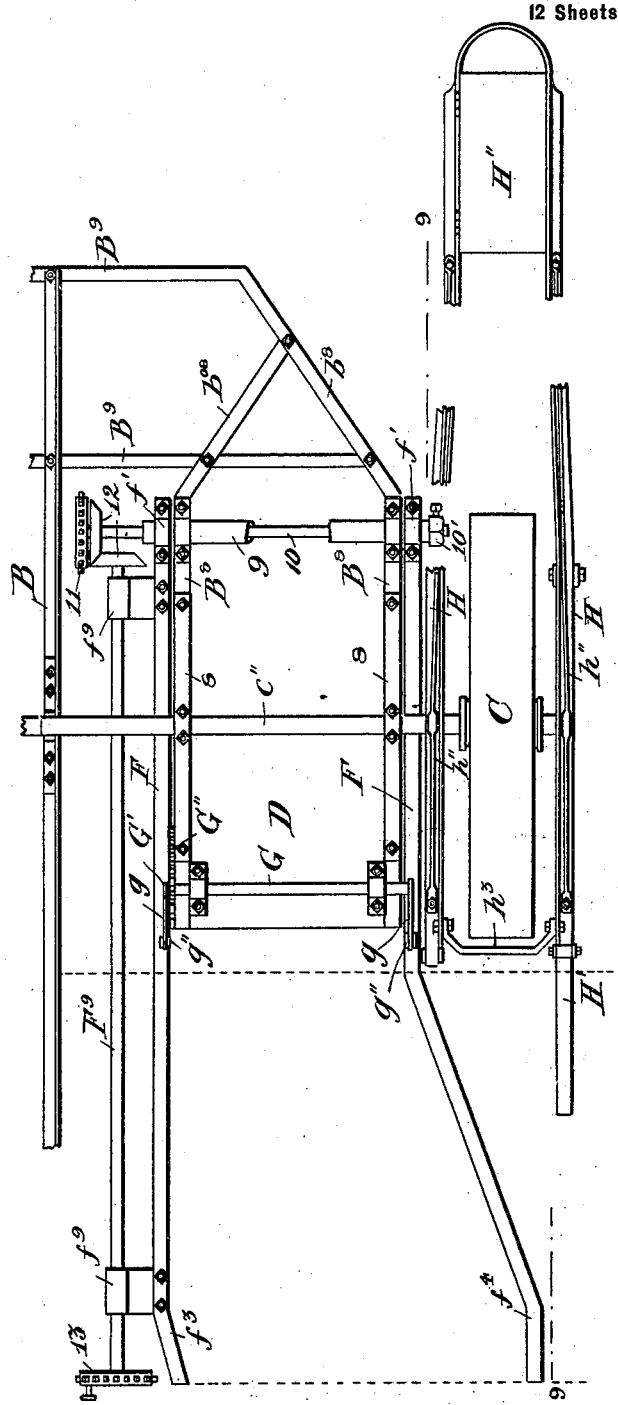

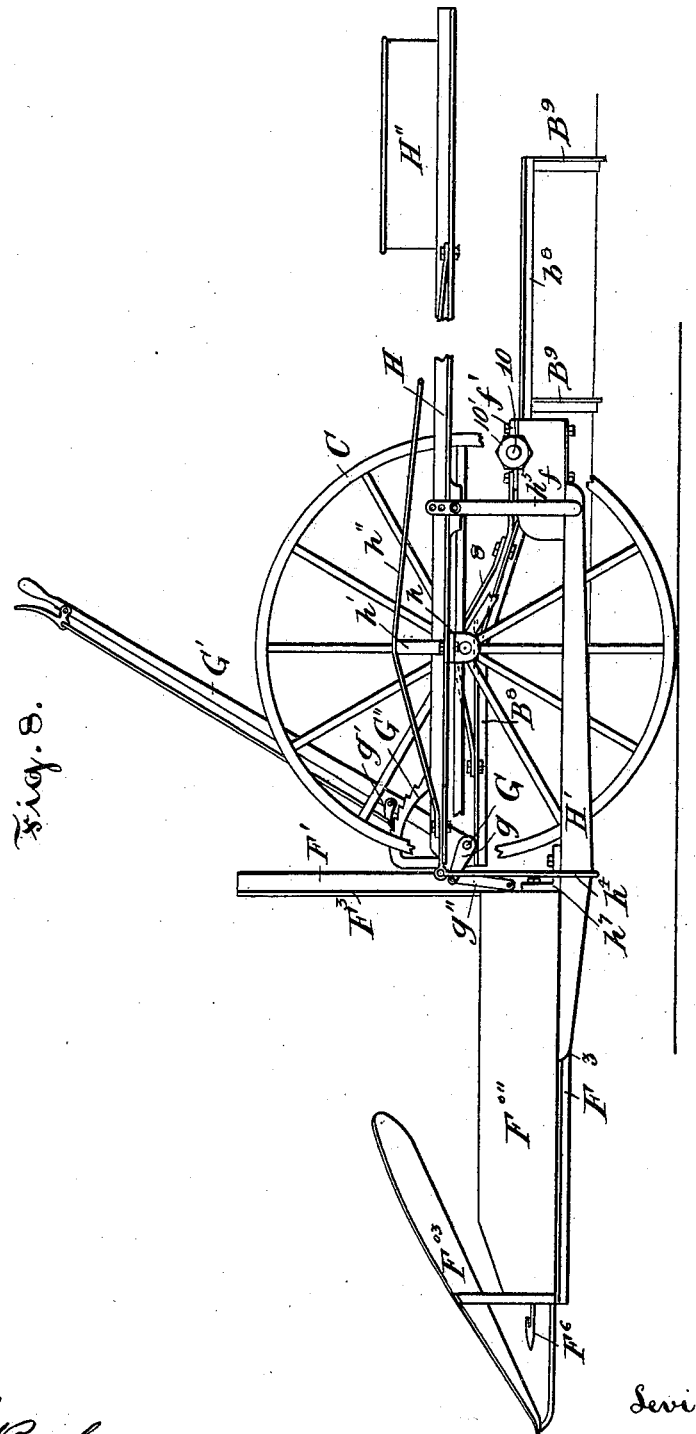

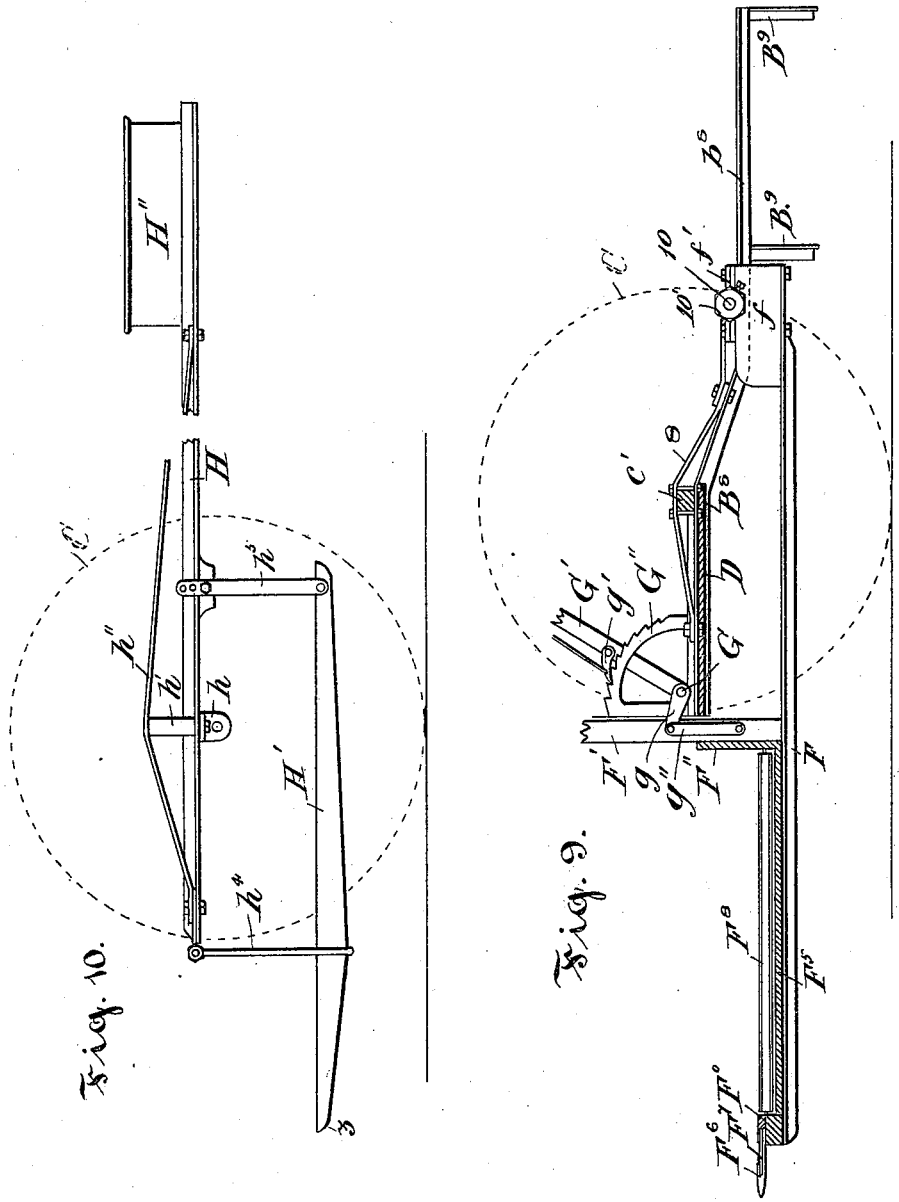

No. 647,939. Patented Apr. 24, 1900.
L. BRONSON.
COMBINED HARVESTER, THRESHER, AND SEPARATOR.
(Application filed Aug. 17, 1898.)

(No Model.) 12 Sheets—Sheet 10.

Witnesses:
Chas. Raley.
M. Piotrzkowsky

Levi Bronson
Inventor
by A. B. Harvey
his Attorneys

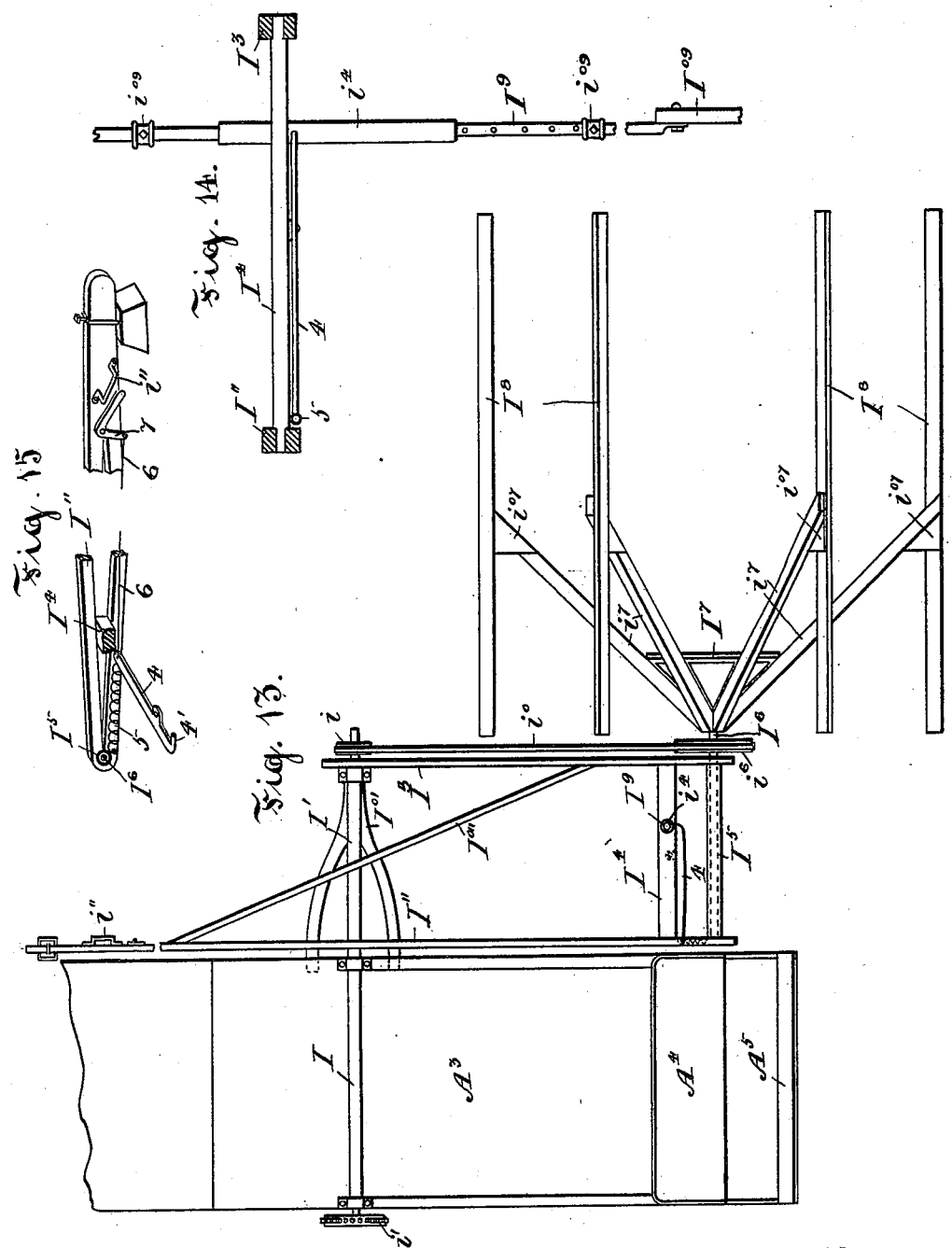

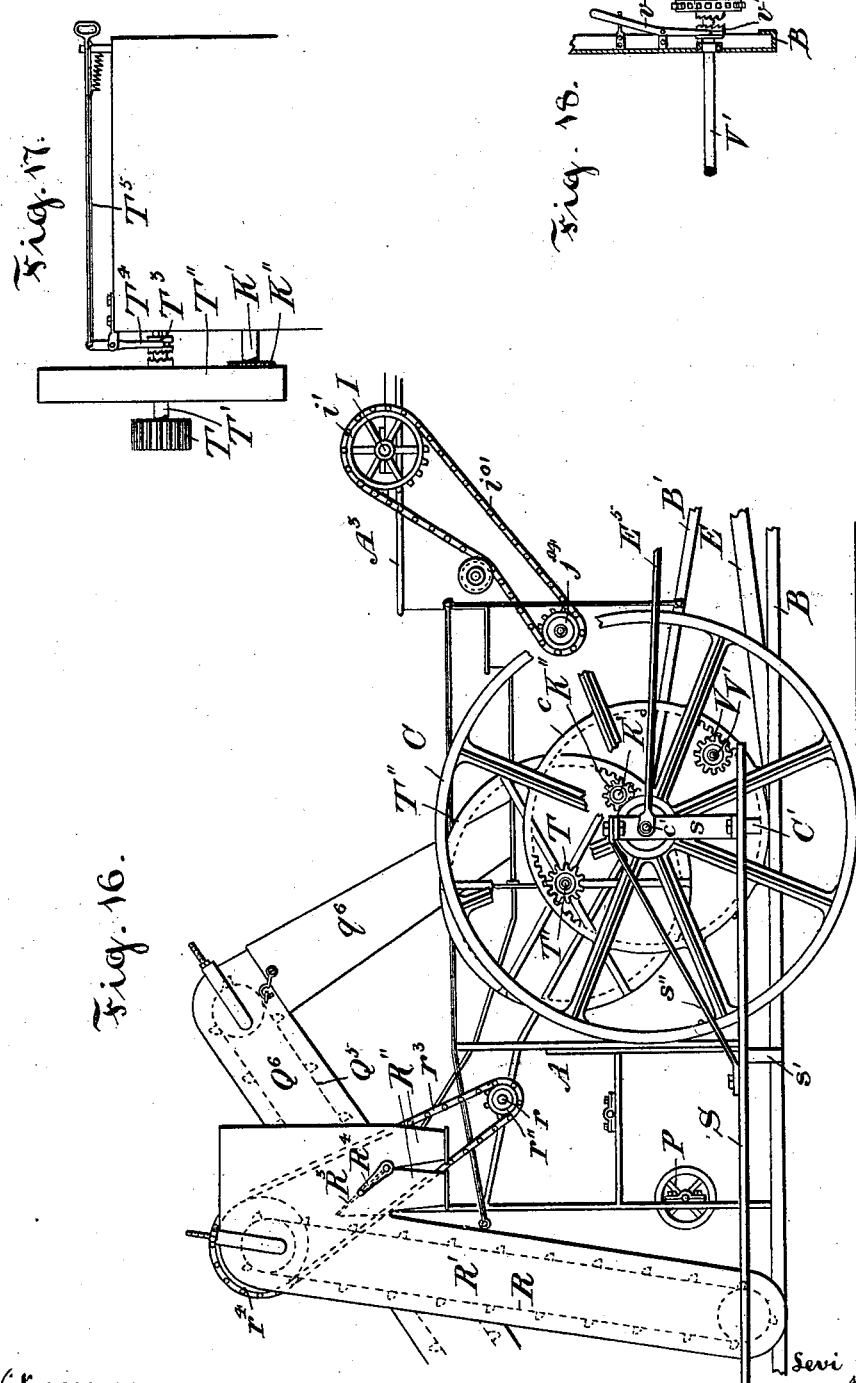

UNITED STATES PATENT OFFICE.

LEVI BRONSON, OF BUFFALO, NEW YORK.

COMBINED HARVESTER, THRESHER, AND SEPARATOR.

SPECIFICATION forming part of Letters Patent No. 647,939, dated April 24, 1900.

Application filed August 17, 1898. Serial No. 688,828. (No model.)

*To all whom it may concern:*

Be it known that I, LEVI BRONSON, of the city of Buffalo, in the State of New York, have invented certain new and useful Improvements in a Combined Harvester, Thresher, and Separator; and I do hereby declare that the following is a full, clear, and exact description of the same, reference being had to the accompanying drawings, forming a part hereof.

My invention, which will be hereinafter fully set forth and claimed, relates to a combined harvester, thresher, and separator.

The object of my invention is to further improve the machine for which a patent was granted to John S. McCormick, No. 581,219, dated April 20, 1897.

Figure 1:
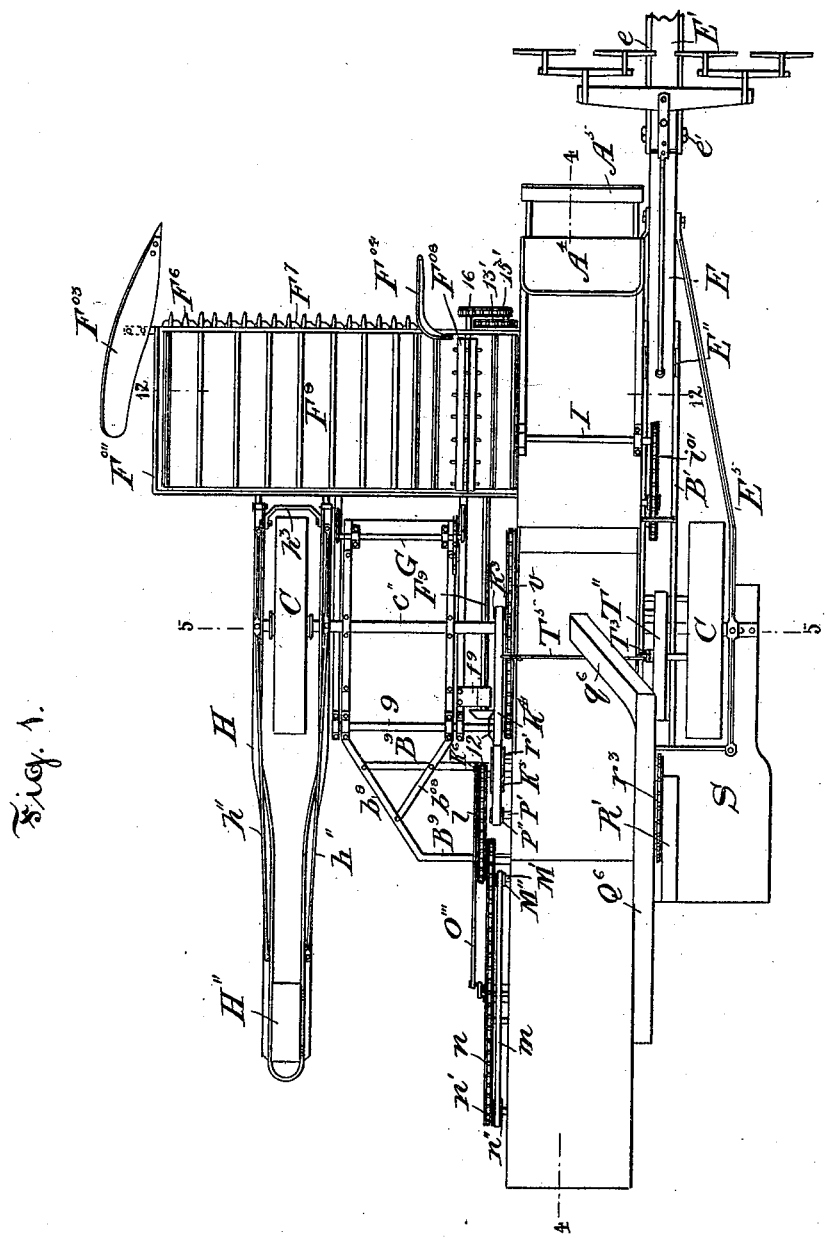
Figure 2:
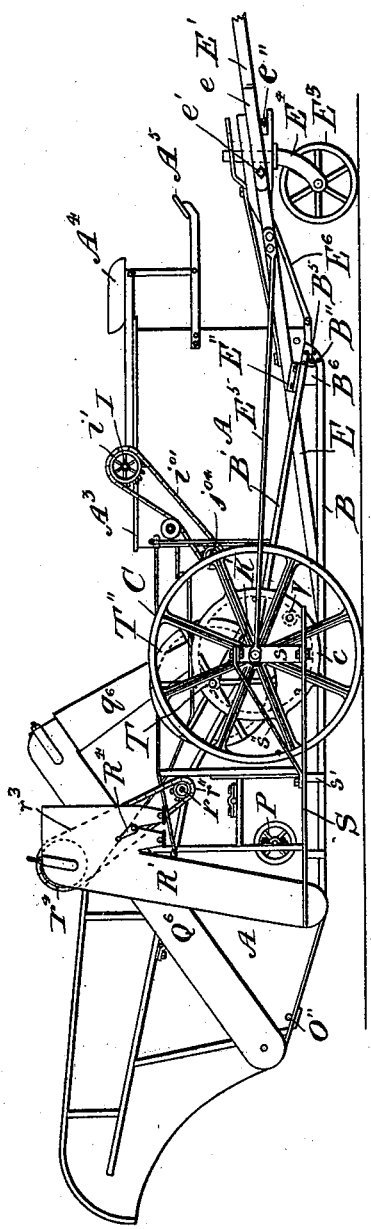
Figure 3:
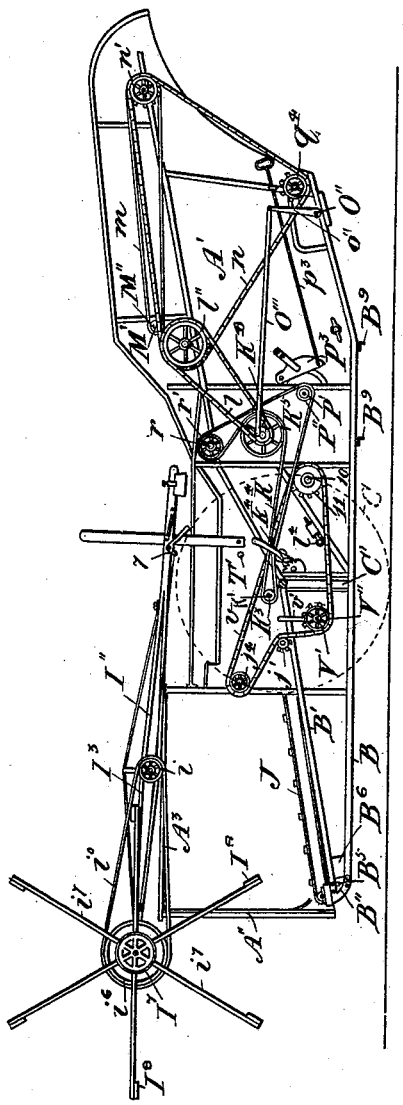
Figure 12:
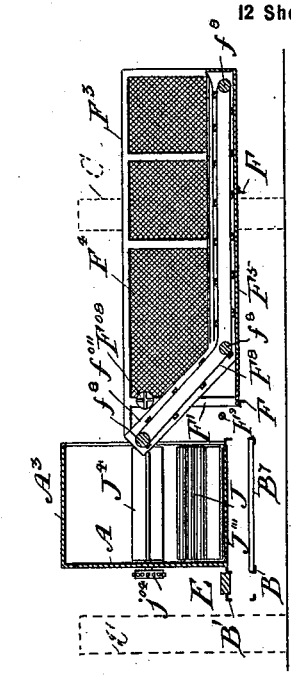
Figure 11:
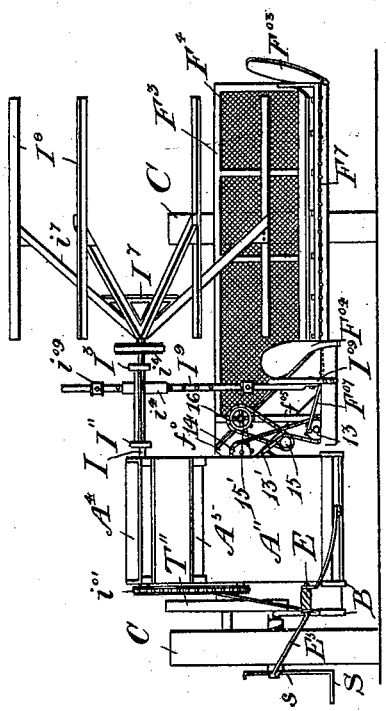

Figure 1 is a top view of my improved machine, the reel being removed. Fig. 2 is an elevation of the same, showing the stubble side. Fig. 3 is an elevation of the same, showing the grain side of the thresher part, the cutting-table being removed and the axle and connecting part of the main frame being in section. Fig. 4 is a longitudinal section of the thresher on line 4 4, Fig. 1. Fig. 5 is a transverse section of the same on line 5 5, Fig. 1, being on the main axle. Fig. 5$^a$ is a detail view. Fig. 6 is a top view of the main frame and axle on a larger scale. Fig. 7 is a top view of the cutting-table frame and its connections. Fig. 8 is an elevation of the cutting-table and its connections. Fig. 9 is a longitudinal section of the cutting-table on line 9 9, Fig. 7, parallel with Fig. 8. Fig. 10 is an elevation of the balance-lever and connections separately. Fig. 11 is a front elevation of the machine. Fig. 12 is a transverse section through the cutting-table on line 12 12, Fig. 1. Fig. 13 is a top view of the reel and its connections. Fig. 14 is an elevation of the reel-post with adjusting device. Fig. 15 is a perspective view of the reel-latch. Fig. 16 is an enlarged view of a portion of Fig. 2, showing the gearing on the stubble side. Fig. 17 is a detail of one of the clutches. Fig. 18 is a detail of another clutch.

*Main frame.*—The foundation of my improved machine (shown in Fig. 6) consists of three V-shaped skeleton sides or frames placed at suitable distances apart and braced together in front or at the point and supported by two main wheels C upon a cranked axle C', as shown in Fig. 5. On the grain side the axle-pin c' does not immediately adjoin the crank-arm, but forms the termination of an extension c'', adapted to carry an auxiliary stationary frame to which a swinging frame carrying the cutting-table is attached. The skeleton sides or frames consist each of two angle-iron or steel bars B B', Fig. 2, one above the other, and converging to what may be called a "point" in front, where they are joined by a plate B''. Two of these are placed to coincide with the sides of the thresher to support the main body of the machine. The third is placed outside a little distance away on the stubble side. A bolt B$^5$ runs through the plates B'' and through tubular distance-pieces B$^3$ and B$^4$, firmly bracing the points together. At the rear of and parallel to this brace is placed a stout piece of timber B$^6$, firmly secured to give substance to the point as a head. Diagonal braces B$^7$ B$^7$, extending from said axle, are secured to the lower bars of the main body-skeletons to stiffen the frame. Upon the extension c'' of the axle is secured another auxiliary frame, consisting of two bars B$^8$, Figs. 5 and 6, parallel to the V-frames B B', but much shorter, some distance apart and some small distance from the adjacent V-frame. A brace C'' connects said extension with the arm and V-frame and supports a strut C$^8$ under the inner frame-bar B$^8$. These bars B$^8$ have converging tailpieces $b^8$ and $b^{08}$, which are secured to two cross-bars B$^9$, bent down and extending across the bottom of the V-frames at and near their tail ends and rigidly secured to the latter. The bars B$^8$ thus formed into a frame, bent to slope a little from the rear end up to and passing under the axle, are secured to the latter by straps 8, passing over the axle and bolted to the bars. A tube 9 is secured transversely upon the bars B$^8$ at the rear end, which is adapted to form bearings for a shaft and the projecting ends of which form the trunnions for the swinging table-arms. This frame B$^8$ carries a small platform D, Fig. 9, rigidly secured to it, from which the table, reel, and gearing are regulated.

The tongue E' is pivoted to a stock E, Figs. 1, 2, and 16, which is secured between the two V-frames at the stubble side, extending from a point near the axle C', where it is bolted to the lower bars B, to beyond the cross-piece B⁶, upon which it is bolted between two brackets E'', Fig. 2, which are secured to the top bars B'. A brace E⁵ connects it to the axle-arm and another, E⁶, to the cross-piece B⁶. The tongue is forked, two side pieces e, rigidly secured, forming the fork, which receives the end of the stock and through which the draft-bolt e' passes. A spring-support e'' holds it up. The projecting end of the stock is supported by a caster-wheel E³, journaled in a swivel-bracket E⁴, with curved arms and a pin passing into a socket or bearing in the stock and adapted to turn therein, forming a pivotal support adapted to readily assume the directions of the tongue. It is adjustable for height by interposing washers. The draft appliance — doubletree — is applied in the usual manner. This caster gives the whole framework, with its full equipment balanced to weigh slightly forward, its third point of support, and thus makes it a stable structure.

*Cutting-table frame.*—The cutting-table is carried upon two arms F, which are pivoted upon the trunnions formed by the ends of the tube 9, as seen in Figs. 7, 8, and 9, alongside and outside the frame-bars B⁸ below the main-axle end, adapted to swing in a plane at a right angle to the axle. To give these arms a lower set to clear the axle, blocks f are secured to them, upon which the bearings f' are placed, and their forward ends extend to the front of the machine. The arms F are adjustably connected with the forward end of the stationary auxiliary frame B⁸ in the following manner:

Transversely across the bars B⁸ and near their forward ends is journaled upon the platform D a rocking shaft G, having at each end a crank-arm g and at one end an upright lever G', all rigidly secured to it. The lever G' is provided with the usual spring-latch lock g', adapted to engage the notches of a toothed sector G'', secured to the bar B⁸ near the lever, so that the latter can be held in any position. The ends of the crank g are connected to posts F', rigidly secured to the bars F by means of links g'', pivoted to the arms and posts. It will thus be understood that when the latch g' is in the last notch forward in the sector G'' the table is in its lowest position. When in the last notch rearward, the table is held in its highest position. The lever G' is adapted to be operated while standing on the platform D.

In order to take off some of the weight that has to be lifted by the lever G', the table is counterbalanced by a weighted balance-lever, as seen in Figs. 1, 5, 7, 8, and 10.

On each side of the grain-side main wheel C a neck is formed in the axle-pin c' for a journal-bearing h, secured to a bar H, extended rearwardly and at the rear end joined to its fellow. A weight is placed on this joined end of the bars, which may take the shape of a tool-box H'', as shown, and which may be loaded with additional weight at pleasure. Each bar is trussed with a strut h' and rod h''. The forward ends of the bars H are connected transversely by a bail h³. A suspended beam H' is connected with the forward end of the outer arm by a stirrup h⁴, and at the rear of the axle by a pivoted link h⁵, its forward end 3 projecting a little distance under the table, which latter rests upon it. The inner bar of the balance-lever is linked to a bracket f'' on the backboard of the table by a stirrup h⁶ passing over said bar and being pivoted to the bracket f'' by a pin, as seen in Figs. 5 and 5ᵃ. A bracket h⁷, Fig. 8, is secured to the beam H', to which the backboard of the table is bolted. The forward end 3 is left unconnected.

The forward ends of the table-arms F are bent more or less toward the grain-side end, one, f³, to clear the crank-disk and the other, f⁴, to obtain a more central position as a support for the superimposed parts. To the posts F' is secured the backboard F''', and above this a frame F³, carrying a wire-mesh screen F⁴, Figs. 8, 9, and 12. A finger-bar F⁰ is secured to the front ends of the arms F and extends at one end close to the grain-side V-frame and at the other to the grain-side end of the table. A wooden floor or platform F⁵, carried by the arms F, extends between the backboard F''' and the finger-bar F⁰ and from the grain-side end of the table under the level portion of the apron. At the grain-side end is placed the side board F⁰'', with the usual divider F⁰³, Figs. 1, 8, and 12. Upon the finger-bar F⁰ are secured the fingers F⁶, in which runs the knife F⁷, as seen in Figs. 1 and 9.

*Cutting-table mechanism.*—The table carries the usual slatted carrier-apron F⁸, Figs. 1, 9, and 12, running over rollers f⁸, two of them journaled below the level of the finger-bar and one at the delivery end, in a raised position, close to and over the elevator, so that said apron will form an incline at said end, suitable guides for the edges being provided in the ordinary manner and as is well understood by persons versed in the art. The channel for the apron is continued up the incline by an extension f⁰''' of the backboard, conforming to said incline, and a corresponding board f⁰ is placed at the front. These inclined parts of the channel are secured to the post F', secured to the arm F in the rear, and to a post f⁰⁵, secured to the finger-bar F⁰ in front.

Motion is transmitted to the cutting-table in the following manner: A shaft 10 is journaled in the tube 9, Figs. 6, 7, and 9, held by a collar-nut 10' at one end and carrying at the other end a sprocket-wheel 11, over which runs a pitch-chain from the thresher to rotate it. To the inner table-arm F f³ are secured brackets f⁹, in which is journaled a side shaft F⁹ in the same plane as shaft 10 and geared to it by a pair of bevel-wheels 12, as seen in Fig. 7. The shaft F⁹ (seen also in Fig. 12) extends to the front edge of the table, where it carries a crank-disk 13, which is at the same time a sprocket-wheel. (Seen also in Fig. 11.) Said crank-disk operates the pitman $F^{07}$ connecting the knife $F^7$. A pitch-chain 13' runs over the sprocket-wheels 13 and 14, the latter secured on the axle of the elevated apron-roller $f^8$, which drives the apron $F^8$ and on the way running over a double sprocket-wheel 15, to which it gives motion, and which, by a chain 15' and another sprocket-wheel 16, drives a picker $F^{08}$, as seen in Figs. 11 and 12. $F^{04}$, Fig. 11, is a grain-guard.

*Reel.*—The reel is shown in Figs. 3, 13, 14, and 15 and parts of it in Figs. 2, 11, and 16. Upon the box or casing forming part of the thresher, which will be described farther on, is journaled a shaft I, carrying a sprocket-wheel $i'$ on the stubble side and projecting considerably at the grain side. Upon the projecting part of said shaft is journaled a frame with a tubular center, sleeve, or elongated hub $I'$, having a long bar $I''$ secured to it at one end and extending to both sides, and another $I^3$, extending to one side only, to the other outer end. These two bars are connected near their even forward ends by a cross-bar $I^4$ and carry at the end a tubular bearing $I^5$. The tubular hub $I'$ is supported at its outer end by a bearing on a bracket $I^{0'}$. A brace $I^{0''}$, secured to the bar $I''$ near its rear end and to the bar $I^3$ near its forward end and crossing the tube $I'$, gives stiffness to the frame. In the tubular bearing $I^5$, situated a little in advance of the finger-bar $F^6$, is journaled a shaft $I^6$, carrying at its projecting end a pulley $i^6$ and a conical spider $I^7$. The shaft I also carries a pulley $i$, and this is connected with the pulley $i^6$ by a belt $i^0$. To the spider $I^7$ are secured radial arms $i^7$, and to the ends of these, the connections strengthened by gussets $i^{07}$, the parallel cylindrically-disposed bars $I^8$, coextensive with the fingers $F^6$. The bar $I''$ serves as a lever for raising and depressing the frame end with the reel-shaft $I^6$, and the latter is steadied and connected with the table below by a perforated rod $I^9$, bolted at the foot to a post $I^{09}$, Fig. 11, and passing through a tube $i^4$, secured in the cross-bar $I^4$ and provided with the collars $i^{09}$, acting as stops, as seen in Fig. 14. To the cross-bar $I^4$ is pivoted a latch-lever 4, having a pin 4', operating in a perforation in the tube $i^4$ and adapted to engage the perforations in the rod $I^9$, being held in engagement by a spring 5. For operating the pin 4' the spring-actuated end of the latch-lever 4 is connected by a wire 6 to a trigger 7, pivoted to the lever end of the bar $I''$, by which said latch-lever may be retracted against the pressure of the spring 5 and the pin 4' caused to disengage the perforation in the rod $I^9$, as shown in Fig. 15. A handle $i''$ is secured to the lever $I''$ near the trigger for convenient operation of the lever and catch which is manipulated from the platform D. The lever $I''$ is trussed to add stiffness to lightness. To set the reel higher or lower, it is only necessary to release the pin 4' by pulling the trigger 7 and then raising or depressing the lever $I''$, as may be desired, and until the pin engages the desired perforation in the rod $I^9$.

The description thus far relates principally to the general framework and mainly to the cutting-table and reel, with their gear. The general gearing and thresher part remains to be described, and the latter is taken first.

*Thresher.*—Boarded sides A and A', with suitable ribs, Figs. 2, 3, 4, 5, 11, and 12, are rigidly secured to the two grain-side V-frames and form part of the general framing and casing of the thresher, being shaped to suit the requirements of the latter. The side A on the stubble side extends the full length to the front of the machine, being extended a little beyond the point of the V-frames, the side A' having a large opening for the reception of the delivery end of the slatted apron $F^8$. This part of the casing, with the front board A'', is carried high up, covered with a top $A^3$, upon which the reel-driving shaft I is journaled and the front of which carries brackets for the driver's seat $A^4$, Figs. 1, 2, 4, and 11, and a footboard $A^5$. Low down in this casing is placed the slatted elevator belt or apron J, Figs. 3, 4, and 12, rising toward the concave $K^{0''}$, Fig. 4, and running over rollers $J'$ and $J''$ at the ends, the upper one, $J'$, of which receives motion. Below the elevator is a floor or sheet $J'''$. The concave is hinged at the rear, and the front is made adjustable by means of a link $k$, lever $k'$, and sector $k''$. Above the concave is the cylinder K, with its cover $K^{0'}$, and above the upper end of the elevator and facing the cylinder is the picker $J^4$. The material discharged by the cylinder (grain, chaff, and straw) is received by a cellular belt or apron L, running over rollers $L''$ and $L'''$, the upper one of which is driven and the lower one placed under the concave $K^{0''}$ and carried in adjustable bearings $l^4$, Fig. 3. The upper course of this apron runs over a series of rollers $L'$ and, assisted by the picker M, journaled at the head, delivers the straw upon the straw-carrier N, the finer stuff dropping between the ends of the apron L and the straw-carrier, a divide-board $L^4$ being placed between them. The straw-carrier N runs over two rollers $N'$ $N''$ and over an agitator $N^0$, the upper one of which is the driven one. It carries the straw over the top rollers and drops it. The small stuff passes between the slats of the straw-carrier and drops upon the inclined bottom $N^3$ immediately under it, sliding down the latter and dropping with that which drops at the board $L^4$ upon the upper one of the sieves O, forming part of the shoe through which passes the blast of the fan P and collects the clean grain, sliding down the incline $O'$ in the conveyer-casing $Q''$. The shoe is hung on swing-rods and receives a vibrating motion, as usual. The chaff is blown out and the tailings, being the heavier parts, such as grain adhering to ears, is collected in another conveyer-casing $Q^3$ at the rear end of the shoe, brought to the side of the machine by a conveyer $Q^4$ and elevated by an elevator Q⁵ in a casing Q⁶, Fig. 2, and discharged by a spout $q^6$, Fig. 5, into the cylinder-casing K⁰'. The conveyer-casing Q'' is fitted with a conveyer Q, which conveys the clean grain to a pocket on the stubble side, whence it is elevated by an elevator R in a casing R', Figs. 2 and 16, and discharged by one of two delivery-spouts R'' into bags. The two spouts R'' are used alternately—i. e., one is closed while the other is open—a flap R³, controlled by a handle R⁴ outside, closing the throat of either one or the other. A platform S is provided under said spouts, on which a bag may rest and on which an attendant may stand. It is secured by a bracket s, journaled to the end of the axle-pin c', a brace s'', secured to the upper end of said bracket, and one or more additional brackets s', secured to the lower parts of the V-frames. (Also shown in Figs. 2, 5, and 16.) A blast-regulator P³, with handle $p^3$, is provided, as seen in Fig. 3.

*Gearing.*—The gearing is shown in Figs. 1, 2, 3, 5, and 16. All motion is derived from the stubble-side main wheel C, which is provided with an internal spur-rim c, gearing into two pinions T and V. The pinion T is fast upon a cross-shaft T'. Upon this shaft is journaled an internal spur-wheel T''', so that it runs loose upon the shaft, and this internal spur-wheel when connected with the shaft T' drives the cylinder K by a pinion K'' on the cylinder-axle K'. A clutch T³ upon the shaft T' is controlled by a forked lever T⁴, and this is regulated by an adjustable slide-rod T⁵, extending to the other side, so that its handle is accessible from the platform D. (Shown separately in Fig. 17.) At the grain side, Fig. 3, the axle K' carries a small pulley K³, and by means of a belt K⁴, running over the latter, drives the fan P by a pulley P''' on the fan-spindle P', a cross-shaft r by a pulley r', and a larger pulley K⁵, to which is fast a smaller sprocket-wheel K⁶, which is at the same time a crank-disk. The belt K⁴ runs over a belt-tightener $k^4$. The crank-disk K⁶ operates the pitman O''', with lever o'', on the rocking shaft O'', which gives vibratory motion to the shoe. The cross-shaft r has on the stubble-side end, Fig. 2, a sprocket-wheel r'', which by a chain $r^3$ drives a larger sprocket-wheel $r^4$ on the axle of the upper pulley of the elevator R. The sprocket K⁶, by a chain l, drives another sprocket l'', Fig. 3, on the upper roller L'' of the apron L. The sprocket l'' is double and by a chain n drives the straw-carrier N by a sprocket-wheel n' on the upper roller N' and the conveyer Q⁴ by a sprocket-wheel $q^4$ on the shaft of the latter. Fast on the axle of the upper roller N' is also a pulley n'', which by a belt m drives the picker M over a pulley M'' on the axle M' of the picker.

The pinion V, which receives motion from the spur-rim c, is fast upon a cross-shaft V'. The latter carries at the grain-side end a loose sprocket-wheel V'' and a clutch v'', controlled by a lever v', Figs. 3 and 18, by which the sprocket-wheel V'' can be thrown in or out of gear. A chain v, Fig. 3, running over said sprocket-wheel V''', drives the elevator J by a sprocket-wheel j' on the upper roller J', the picker J⁴ by a sprocket $j^4$ on the axle of the latter, and the cross-shaft 10 by a sprocket-wheel 11, Fig. 7, which latter gives motion to the table. On the stubble side the axle of the picker J⁴ carries a sprocket-wheel $j^{04}$, Fig. 2, which drives the sprocket-wheel i' on the shaft I by a chain $i^{0'}$, giving motion to the reel.

Operation: This may be briefly recapitulated as follows: The main body of the machine is carried independently at a uniform height above the ground by the two main wheels C and the caster E⁸, giving it three points of support. The cutting-table being the only part of the machine that stands, as it were, in direct relation to the surface of the ground is made adjustable to the latter and can be carried either high or low, as may be desired. The table is hinged well to the rear of the machine on a platform rigidly carried on the main axle C' and connected with the main frame, and its hinge-center coincides with the driving-shaft 10, from which a shaft F⁹, journaled to the swinging table-frame, derives its motion. When this table is to be raised or lowered, so as to bring the fingers F⁶ farther from or nearer to the surface of the ground, it is effected by the lever G', operated from the platform D. This lever operates the rocking shaft G with lever-arms g, to which the swinging frame is connected by links g'', the shaft being journaled on the platform and the lever being locked into position on the sector G'', secured to the framework supporting the platform. The swinging frame, carrying all the mechanism of the table, is also supported by the counterbalanced beam H H', fulcrumed upon the main axle, to reduce the weight to be manipulated by the lever G'. The reel I⁸ is also controlled from the platform D by means of the lever-arm I'' and the trigger 7, but moves up and down automatically in unison with the table by means of the rod I⁹, carried by the table. The delivery end of the carrier-apron F⁸ is raised above the level of the receiving part, clearing the elevator-belt J when in its lowest position, and all the motions of the table—as knives, apron, and picker—are derived from the one shaft F⁹. The elevator J, with the assistance of the picker J⁴, brings the cut grain delivered upon it by the carrier F⁸ into the concave K⁰'', where it is subjected to the action of the cylinder K. Thence it is delivered upon the cellular belt L, and from this, with the assistance of the picker M, upon the straw-carrier N and the empty straw discharged over the latter, the grain and chaff being collected between the upper end of the cellular belt L and the sloping bottom O' under the straw-carrier and deposited in the shoe. There it is subjected to the action of the sieves O and fan P and the cleaned grain collected in the conveyer-casing Q'', whence it is conveyed by the conveyer Q to one side of the machine, elevated by the elevator R, and discharged through one of the two spouts R″ into bags. While one bag is filling another can be secured to the mouth of the other, and as soon as the bag is full the flap R³ is thrown over by the handle R⁴, and the filling of the empty bag proceeds while the full one is being tied up and removed. The attendant while doing this stands upon the platform S. When the machine is moving but not working, all the gearing and working parts are stopped, except the shafts T′ and V′, the clutches T³ and v″ having been thrown out of gear by the rod T⁵ and the lever v′ by an attendant upon the platform D. The platform D is the station from which all the gearing and adjustments are controlled.

I claim as my invention—

1. In a combined harvester and thresher, the combination of two V-shaped frames supporting the sides of the main body, diagonal braces connecting the forward parts of the lower limbs of said frames, another similar V-frame on the stubble side a short distance from the main body, a transverse bolt passing through tubular distance-pieces connecting the points of said three V-frames, a cranked axle carried by said frame in such position that the frame with its equipment is balanced to weigh slightly forward, an extension of said axle on the grain side in line with the axle-pin, two parallel bars rigidly secured to said extension and rigidly secured at their rear ends to the rear ends of the V-frames and a tubular piece secured transversely upon said last-named bars forming a bearing for a shaft and trunnions for a swinging frame, substantially as set forth.

2. In a combined harvester and thresher, the combination with the main frame and main axle of an extension between the crank-arm and the axle-pin on the grain side, two frame-bars rigidly secured to said axle parallel to the main frame and rigidly secured thereto at the rear, a tubular piece rigidly secured upon said stationary frame-bars parallel to and at the rear of the main axle and having projecting ends forming trunnions, two arms journaled upon said trunnions close to and outside of said frame-bars so as to swing in a plane at a right angle to and under the main axle, a platform rigidly secured upon the forward ends of said frame-bars, a rocking shaft journaled transversely upon the forward end of said platform, lever-arms at the ends of said rocking shaft, links connecting said lever-arms with the swinging arms, a hand-lever with spring-latch lock rigidly secured to said rocking shaft and a toothed sector secured to the stationary frame-bars adapted to engage the latch-lock, substantially as set forth.

3. In a combined harvester and thresher, the combination with the main frame and main axle of stationary frame-bars rigidly secured to an extension of said axle on the grain side in line with the axle-pin and rigidly connected at the rear with the rear of the main frame, a tubular piece secured upon said stationary frame parallel to and at the rear of said axle and having overhanging ends forming trunnions, two arms journaled upon said trunnions close to and outside of the frame-bars so as to be adapted to swing on said trunnions in a plane at a right angle to the main axle, a transverse piece secured to the forward ends of said arms and projecting at each end and connecting said arms into a swinging frame, a shaft at the side of and parallel to the inner arm of said swinging frame and journaled in brackets secured thereto, a shaft journaled in said tubular bearing so that the centers of said shafts intersect at a right angle, bevel-wheels connecting said shafts and means of rotating said transverse shaft, substantially as set forth.

4. In a combined harvester and thresher, the combination with the main frame, of a cranked axle supporting the same and having an extension on the grain side in line with the axle-pin adapted to support a frame extension between the wheel and main body, wheels upon the axle-pins of said axle, an auxiliary stationary frame rigidly secured to said axle extension and rigidly connected to the main frame at the rear, a platform supported upon the forward end of said frame, a tubular piece secured to said frame at the rear and parallel to said axle and its ends projecting to form trunnions, a shaft journaled in said tubular piece, means upon said shaft by which it may receive rotary motion from the main body, two arms journaled upon said trunnions close to and outside of the bars of said stationary frame so as to swing in a plane at a right angle to and below said axle, a shaft at the side of and parallel to the inner arm and journaled in brackets on said arm, bevel-wheels connecting said shafts, a rocking shaft journaled upon and near the forward end of said platform parallel to the main axle, lever-arms on said rocking shaft, links connecting said lever-arms and swinging arms, a hand-lever with locking-latch secured to said rocking shaft, a sector secured to the platform-frame and adapted to hold said hand-lever in position, a balance-lever fulcrumed upon the main axle and linked to the swinging frame and adapted to assist in holding it up, substantially as set forth.

5. In a combined harvester and thresher, the combination of a main axle and main wheels, a main frame supporting the thresher rigidly secured upon said axle, an auxiliary frame rigidly secured upon said axle alongside the main frame on the grain side and rigidly connected therewith at the rear, a transverse shaft journaled upon said auxiliary frame parallel to and at the rear of the main axle, arms journaled upon said shaft outside of said auxiliary frame adapted to swing in a plane at a right angle to the axle and extending forward beyond the forward end of said auxiliary frame, a backboard secured to said arms in proximity to the forward end of the auxiliary frame, two lever-arms journaled upon the main axle one at either side of the grain-side main wheel and rigidly connected at front and rear, a balance-weight at the rear end of said lever, a stirrup passing over the forward end of the inner lever-arm and pivotally connected with said backboard, a beam below the outer lever-arm projecting forward under said backboard, a bracket connecting said backboard to said beam, a stirrup passing around said beam and pivoted to the forward end of the outer lever-arm and a link connecting the rear end of the said beam to said arm at the rear of the main axle, substantially as set forth.

6. In a combined harvester and thresher, the combination with the main frame and axle of an auxiliary frame rigidly secured to it, trunnions secured to said auxiliary frame parallel to and at the rear of the main axle, arms journaled upon said trunnions extending to the front of the machine and adapted to swing on a plane at a right angle to the main axle, a side shaft journaled to the inner arm and parallel thereto and intersecting the prolongation of the center line of said trunnions at a right angle, a combined crank-disk sprocket-wheel upon the forward end of said side shaft, a transverse finger-bar upon the front of the swinging arms, a backboard upon said swinging arms, apron-rollers journaled between said finger-bar and backboard below the upper surface of said finger-bar, posts at the stubble-side end of said finger-bar and the inner swinging arm, sloping channel-boards secured to said posts and backboard, an elevated roller journaled to said posts, an apron running over said rollers, a picker journaled to said posts, a double sprocket-wheel having the axle journaled to the sloping channel-boards, sprocket-wheels on said upper roller and picker, a chain running over the combined crank-disk and sprocket-wheel the sprocket-wheel on the upper roller and the double sprocket-wheel and a chain running over said double sprocket-wheel and the picker sprocket-wheel, substantially as set forth.

7. In a combined harvester and thresher, the combination of a main frame an auxiliary frame rigidly connected at the rear but with a free space between them, a cranked axle supporting the same, wheels supporting said axle tongue-stock secured to the main frame, a caster supporting the forward end of the main frame by said tongue-stock, a casing secured to the main frame having a large opening in the grain side at the forward end, an elevator-apron in the forward end of said casing, rollers carrying said apron, a sprocket-wheel on the axle of the upper roller, an internal spur-rim on the stubble-side main wheel, a pinion gearing in said spur-rim, a shaft upon which said pinion is fast, a clutch upon the grain-side end of said shaft, a lever controlling said clutch, a sprocket-wheel loose upon said shaft and adapted to be engaged by said clutch, a chain running over said sprocket-wheel and driving the upper roller of the elevator-apron picker and another sprocket-wheel, a cross-shaft journaled upon the auxiliary frame upon which shaft said sprocket-wheel is fast, a swinging frame journaled upon trunnions forming extensions of the bearings of said cross-shaft, a side shaft journaled to said swinging frame so that its center intersects the center of said cross-shaft, bevel-wheels connecting said shafts, a finger-bar secured upon the forward ends of said swinging frame, a carrier-apron with upwardly-sloping end running transversely across said swinging frame upon rollers journaled upon said frame so that its elevated end projects into the opening in the casing of the thresher over the elevator-apron, a knife-bar in said finger-bar, a combined crank-disk and sprocket-wheel upon the forward end of the side shaft, a pitman connecting said knife and crank-disk, a picker journaled in proximity to the elevated portion of the apron, a double sprocket-wheel having its axle journaled to said sloping channel, a chain driving said double sprocket and the upper apron-roller from said combined crank-disk and sprocket-wheel and a chain driving the picker from said double sprocket-wheel, and means of variably connecting said swinging frame with the auxiliary frame, substantially as set forth.

8. In a combined harvester and thresher, the combination with the main frame of the casing of the thresher, a cross-shaft journaled upon the forward part of the same and projecting on the grain side, a tubular sleeve or elongated hub journaled upon said projecting end, a bar secured to said sleeve at the main-body end projecting to both sides, another shorter bar secured to the other end and projecting forward, a cross-bar connecting the forward ends, a brace connecting said side bars and sleeve, a bracket supporting said sleeve secured to the main body, an upright tubular sleeve secured to the cross-bar, a latch-lever pivoted to said cross-bar provided with pins engaging a perforation in said vertical sleeve, a trigger pivoted to the long bar near the rear end, a connecting-piece between said trigger and latch-lever, a vertical rod having perforations adapted to engage the pin of the latch-lever and secured at its foot to the table below and collars on said rod acting as stops against the ends of the upright tubular sleeve, a swinging frame journaled to swing up and down to which the foot of the perforated rod is secured and an auxiliary frame secured to the main frame upon which said swinging frame is journaled, substantially as set forth.

9. In a combined harvester and thresher, the combination with the main frame supported upon a main axle and wheels and a tongue-stock and caster-wheel, of a casing containing the thresher mechanism, a cross-shaft journaled upon the forward part of the same and projecting on the grain side, a swinging frame journaled upon the projecting end and a pulley upon the end projecting beyond said frame, a shaft journaled at the forward end of said frame in a tubular bearing and carrying a pulley, a belt connecting said pulley with the first-mentioned pulley, a conical spider upon said projecting end and arms with bars secured to said spider, means of steadying said frame vertically, a sprocket-wheel upon the stubble-side end of the shaft, an elevator-apron in the casing below, rollers upon which said apron runs, a picker journaled above the upper roller of the elevator-apron and having a sprocket-wheel at each end of its axle, a chain connecting the sprocket-wheel on the stubble side with the sprocket-wheel on the reel-driving shaft, an internal spur-rim on the stubble-side main wheel, a pinion gearing in said spur-rim, a cross-shaft upon which said pinion is fast, a clutch upon the grain-side end of said cross-shaft, a lever controlling said clutch, a loose sprocket-wheel upon said shaft adapted to be engaged by said clutch and a chain running over said sprocket-wheel and driving the upper elevator-roller and picker, substantially as set forth.

10. In a combined harvester and thresher, the combination of a main frame and thresher-frame and casing, a crank-axle supporting the same, main wheels supporting said axle, a tongue-stock secured to the main frame, a swivel-caster supporting said stock, an internal spur-rim on the stubble-side main wheel, two pinions gearing into said internal rim, cross-shafts journaled in the main frame and casing upon which said pinions are fast, an internal spur-wheel journaled upon one of said shafts at the same end as the pinion, a clutch upon said shaft adapted to engage said wheel, a lever controlling said clutch and a rod operating said lever from the other side of the frame, a thresher-cylinder journaled in said casing, a pinion upon one end of the axle of said cylinder gearing into said internal wheel, a pulley upon the other end of the said axle driving several parts of the threshing mechanism by means of a belt, a clutch upon the other end of the other shaft, a lever controlling said clutch, a sprocket-wheel loose upon said shaft and adapted to be engaged by said clutch and a chain connecting the same with the elevator-roller, picker and cross shafts giving motion to the cutting mechanism and the picker transmitting motion to the reel, substantially as set forth.

11. In a combined harvester and thresher, the combination of a main frame and thresher-frame and casing, a crank-axle supporting the same, a plain road-wheel supporting said axle on the grain side, a road drive-wheel supporting it on the stubble side, an internal spur-rim on said drive-wheel, two pinions gearing into said internal rim, cross-shafts journaled in the main frame and casing upon which said pinions are fast, an internal spur-wheel loose upon one of said shafts and controlled by clutch mechanism and adapted to give motion to the cylinder and by it to all the parts of the thresher except the elevator-apron and picker over it, a sprocket-wheel loose upon the other end of the other shaft controlled by clutch mechanism and adapted to give motion to the elevator-apron, picker, reel and cutting-table, substantially as set forth.

In testimony whereof I hereby affix my signature in the presence of two witnesses.

LEVI BRONSON.

Witnesses:
A. HARVEY,
B. HARVEY.